United States Patent [19]
Cheshire

[11] Patent Number: 5,503,928
[45] Date of Patent: Apr. 2, 1996

[54] FIBRE REINFORCED COMPOSITES

[75] Inventor: Edward J. Cheshire, New Alresford, England

[73] Assignee: New Millennium Composites Limited, Alton, England

[21] Appl. No.: 916,848

[22] PCT Filed: Feb. 20, 1991

[86] PCT No.: PCT/GB91/00263

§ 371 Date: Aug. 18, 1992

§ 102(e) Date: Aug. 18, 1992

[87] PCT Pub. No.: WO91/13195

PCT Pub. Date: Sep. 5, 1991

[30] Foreign Application Priority Data

| Feb. 22, 1990 | [GB] | United Kingdom | 9004037 |
| Apr. 12, 1990 | [GB] | United Kingdom | 9008425 |
| Nov. 14, 1990 | [GB] | United Kingdom | 9024778 |

[51] Int. Cl.$^6$ .............. D02G 1/02; D02G 3/22; D02G 3/24

[52] U.S. Cl. .......... 428/357; 428/359; 428/397; 57/253; 28/240; 28/243; 264/167; 264/171; 264/232; 264/280; 264/288.4; 264/288.8; 264/291; 264/209.2; 264/209.5; 264/209.6; 264/172.11

[58] Field of Search .......... 425/66, 71; 264/167, 264/171, 174, 232, 280, 288.4, 288.8, 29, 209.2, 209.5, 209.6; 428/357, 359, 397; 57/253; 28/240, 243

[56] References Cited

U.S. PATENT DOCUMENTS

| 3,719,442 | 3/1973 | Schippers et al. | 425/66 |
| 4,242,862 | 1/1981 | Neyishi et al. | 57/287 |

Primary Examiner—Patrick J. Ryan
Assistant Examiner—Richard Weisberger
Attorney, Agent, or Firm—Watson, Cole, Grindle & Watson

[57] ABSTRACT

In the manufacture of reinforced composites having reinforcing filaments within a matrix, a filament consisting of a staple yarn spun from discontinuous fibers with low twist is subject to controlled stretching to vary the weight per unit length of the yarn along the length of the yarn. Apparatus for performing the stretching operation comprises two roll pairs spaced apart along the yard feed path and rotated at controlled relative speeds to obtain the desired elongation of the yarn. The yarn may be used directly in producing a composite, e.g., by applying resin to the yarn and winding it onto a mandrel or former, or it may be used to prepare a perform, prepeg tape, woven fabric or the like to be used in the production of a shaped composite. The invention makes it possible to vary the characteristics, e.g., thickness and/or strength, over a composite in a way not previously possible.

28 Claims, 4 Drawing Sheets

FIBRE REINFORCED COMPOSITES

BACKGROUND OF THE INVENTION

This invention relates to the manufacture of reinforced composites having reinforcing filaments within a matrix. The invention applies in particular to the manufacture of reinforced plastics composites in which the reinforcing filaments are incorporated in a resin matrix, and the invention is mainly described herein in relation to such composites. However, it is possible to use other materials as the matrix, such as metals, metal alloys, or ceramics, provided the reinforcing filaments can be incorporated into the material without destroying the integrity of their fibres.

The invention is especially, but not exclusively, applicable to the manufacture of reinforced composites by the method of filament winding. The technique of filament winding is well known and is used in the production of a wide variety of hollow articles. Typically a continuous filament, e.g., of carbon or glass fibre, is taken from a reel, led through a resin applicator and guided under generally uniform tension onto a rotating mandrel. Generally several filaments are wound onto the mandrel at the same time. Filament winding machines which are programmable for building up the required shape on the mandrel are known and available in the art. After the resin has cured, the composite is removed from the mandrel, to which release agent is applied as a preliminary step in the manufacturing process to facilitate this removal of the formed article. The filaments used in conventional filament winding methods consist of continuous fibres or previously spun staple yarn, which means they are of substantially uniform cross-section, and hence weight per unit length, along their length. In addition, while exhibiting good strength characteristics under longitudinal tension loads, it is also a feature of the filaments that they will not undergo any significant elongation, and as a consequence will break before being stretched to any significant extent under excessive loads.

The known filament winding methods are not without certain drawbacks. If, for example, a parallel cylinder is being wound, it is necessary to allow a certain dwell time at the end of the mandrel after winding each course of turns along the mandrel to avoid the turns at the end being drawn back away from the end due to the reversal of the filament guide movement. Because of this dwell time, there is formed an extra loop or bulge of material at each end which must be cut off and discarded as scrap. This is inconvenient and an obvious waste of material. If a non-cylindrical moulded article, e.g., a pressure vessel or a complicated shape, is to be produced, the known filament winding methods become less efficient. There is a tendency to wind more material onto a smaller diameter where it is not necessarily needed, and as a result the finished moulding may be heavier and more expensive than theoretically required. In addition, as a consequence of the uniform weight per unit length characteristic of the filaments, it is frequently not possible to ensure adequate strength in certain areas of the moulding without applying more filament than strictly necessary in other areas, due to the limitations of the winding process.

SUMMARY OF THE INVENTION

The present invention aims to at least alleviate the foregoing drawbacks and according to the invention there is provided a method of manufacturing a reinforced composite wherein a staple yarn reinforcing filament is incorporated in a matrix, characterised by the filament being a staple yarn spun from discontinuous fibres with sufficiently low twist to enable elongation of the yarn under tension forces, and the yarn being subjected to controlled stretching whereby the weight per unit length of the yarn is varied along the length thereof.

In the preparation of a conventional spun staple yarn filament for use in a filament winding process, the staple yarn is spun from discontinuous fibres typically 10 to 100 mm long. The fibres are initially spun into a coarse tow which is subsequently drawn and spun into a much longer, thinner fibre. A tight twist is incorporated into the yarn to hold it together and the final yarn has so much friction between the fibres that the yarn will break rather than stretch. In the method proposed according to the present invention, the yarn is spun with relatively low twist so that the fibres are loose enough to be able to slide with respect to each other when the yarn is subject to strong tension forces, and the yarn stretches permanently with a corresponding reduction in its weight per unit length. By controlling a stretching force applied to the yarn, its elongation and hence weight per unit length (and cross-section) are caused to vary as required along the length of the yarn as it is withdrawn from a supply and immediately before use, such as in a filament winding process.

After the yarn has been subjected to controlled stretching according to the method of the invention, it may be consolidated to reduce risks of further elongation.

The invention also provides an apparatus for use in carrying out the method, comprising means for taking a staple yarn from a supply and guiding the yarn along a feed path to conversion means, characterised in that yarn tensioning means are spaced apart along the path and arranged to maintain the yarn under tension therebetween, and control means are provided for controlling the tensioning means to adjust the tension exerted on the yarn and thereby the weight per unit length of the yarn delivered to the conversion means.

The conversion means may be adapted for producing a reinforcement preform, or a tape or woven fabric for further processing to produce a reinforced composite. Alternatively, the conversion means may be adapted for producing the shaped composite incorporating the reinforcing filament. For example, the conversion means could be a pultrusion die or comprise a resin-applying device and mandrel onto which the resin impregnated yarn is wound.

Conveniently, the tensioning means comprises a pair of devices spaced apart along the yarn path and each arranged to grip the yarn. In a preferred embodiment these devices may be nips, each having a driven roll cooperating with an idler roll and rotatable at a controlled speed. It is not essential for the stretching to be carried out in a single step, and two or more successive stretching stages may be used.

In accordance with a further aspect the invention provides an article consisting of a composite material comprising reinforcing filaments within a matrix, characterised in that at least one of the filaments is a staple yarn spun from discontinuous fibres and having a weight per unit length which so varies along the length of the filament that the article has a non-uniform strength and/or stiffness and/or dimensional characteristic.

BRIEF DESCRIPTION OF THE DRAWINGS

A better understanding of the invention will be gained from the detailed description which follows and in which reference is made to the accompanying drawings, in which:

FIG. 2b illustrates a modification to the apparatus shown in FIG. 2a;

DETAILED DESCRIPTION OF THE PREFERRED EMBODIMENTS

Figure 1:
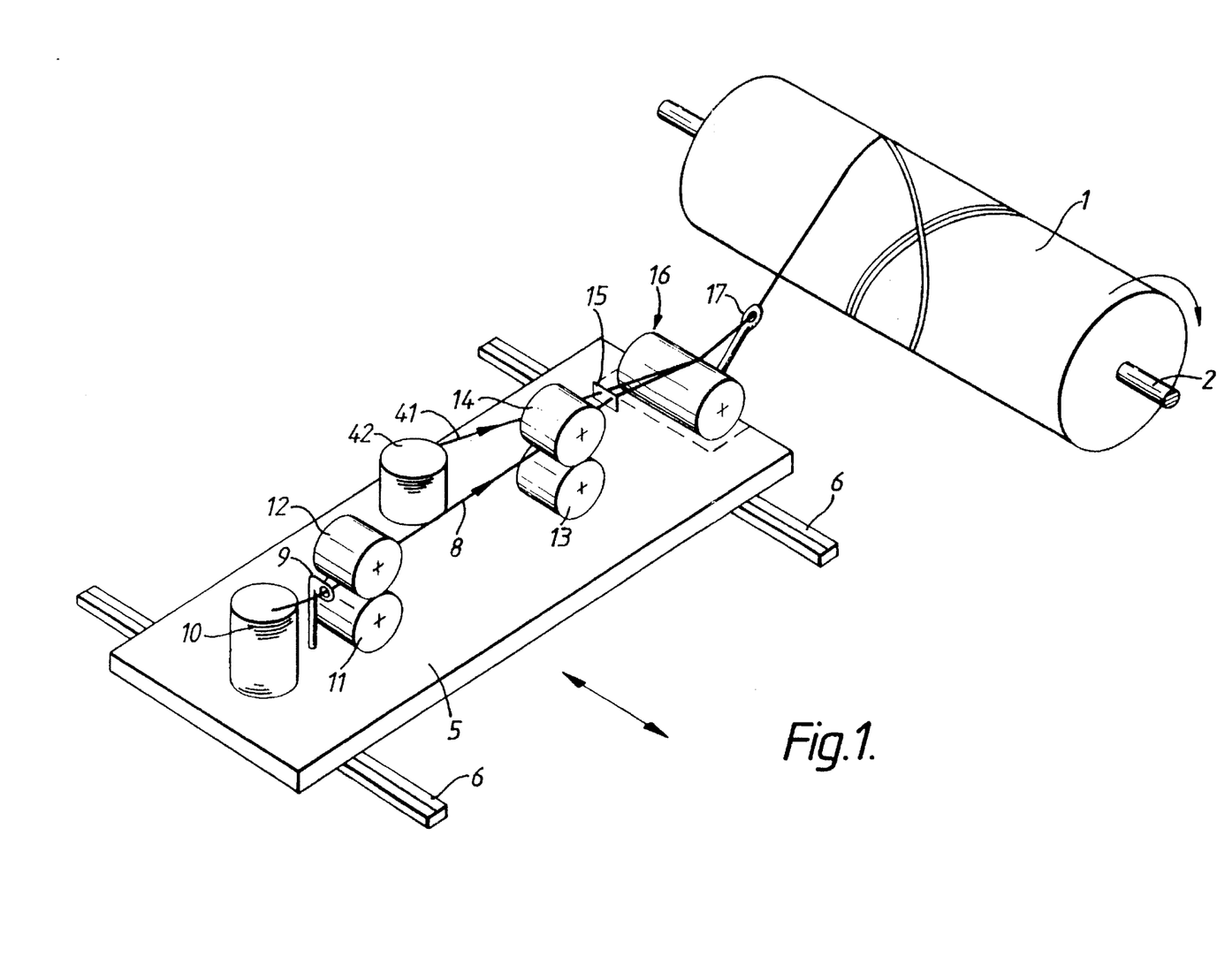
FIG. 1 shows schematically a filament winding apparatus according to the invention.
Figure 2A:
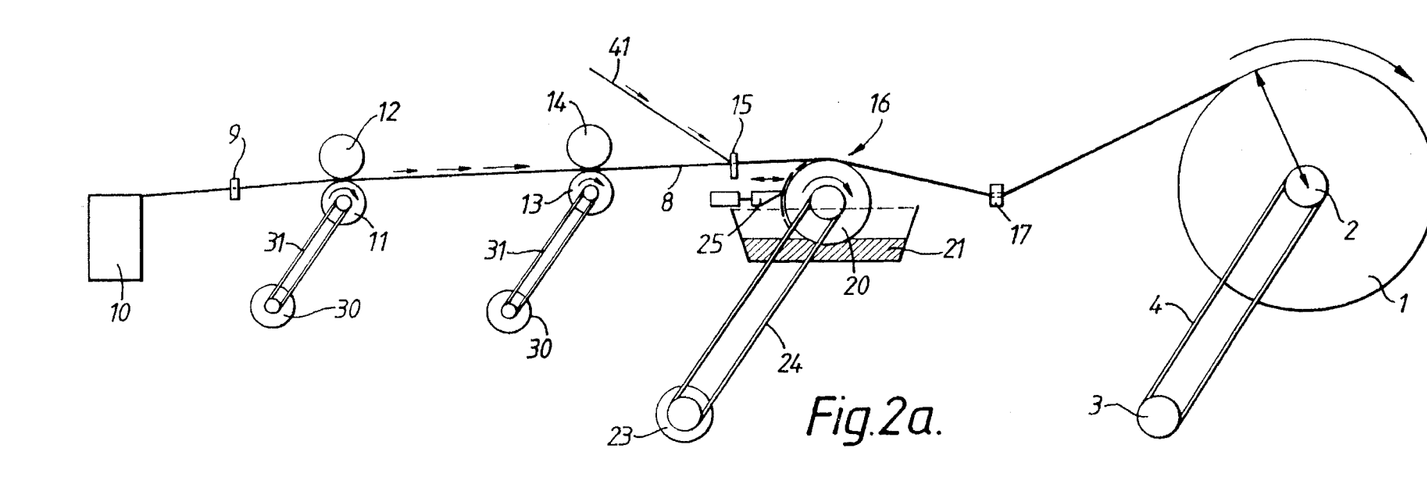
FIG. 2a is a side view of the apparatus shown in FIG. 1 and including additional details of the drive mechanism of the yarn feed system.

The apparatus illustrated in FIGS. 1 and 2a includes a mandrel 1 carried by a drive shaft 2 arranged to be driven in axial rotation by a motor 3 through a toothed belt 4. The mandrel shown is of circular cylindrical shape, but it can have other shapes as well known in the art according to the particular moulded article being produced. The filament feed system is shown mounted on a carriage 5 supported for reciprocal movement by a pair of rails 6 extending parallel to the mandrel axis. The system includes a supply of lightly spun yarn 8, e.g. a creel with a yarn bobbin 10, a guide eye 9, and in series along the yarn feed path a first pair of rolls 11, 12 for gripping the yarn 8, a second pair of rolls 13, 14 spaced from the first pair and arranged to grip the yarn for tensioning and stretching the section of yarn between the roll pairs, a guide comb 15 for lateral guidance of the yarn, a resin applicator 16, and a guiding eye 17.

The resin applicator 16 is shown to be of the type comprising a roller 20 partially immersed in bath of liquid resin 21 and with which the yarn 8 makes contact over a small top portion of the roller. The roller is rotated by a motor 23 through a slipping clutch and drive belt 24. The amount of resin picked up by the surface of the roller as the roller is rotated is controlled by a doctor blade 25 which can be advanced and retracted to and from the roller, e.g. by means of a motor and lead screws, for adjusting the thickness of the resin coating. The slipping clutch is employed to prevent the roller 20 from applying excessive tension forces on the yarn 8 and to avoid slip causing the yarn to pick up too much or too little resin. Instead of the resin applicator shown and described any other device of known form for applying liquid resin to a yarn could be used, such as a device with yarn guides arranged to lead the yarn directly through a resin bath. In accordance with the invention the principal novel feature is the inclusion in the apparatus of means for stretching the yarn 8 by a variable amount between the yarn supply and the resin applicator. This means is constituted by the spaced pairs of rolls 11, 12 and 13, 14. The yarn 8 is a staple yarn with light twist, for example spun from discontinuous fibres of random length and consisting mainly of fibres from 100 mm to 250 mm in length. In the operation of stretching the yarn long fibres may be broken. The fibres used for the yarn may comprise any suitable material such as glass, aramid, carbon, or silicon carbide. However, unlike conventional yarns, the yarn is twisted only lightly so that the yarn can be drawn out or stretched under tension. The first roll pair includes a driven roll 11 and an idler roll 12 in contact with the roll 11 to define a first nip, while the second roll pair includes a driven roll 13 and an idler roll 14 defining a second nip. Each of the rolls 11, 13 is driven by a respective motor 30 through a toothed belt 31, and each includes in its drive system a brake for slowing down the roller rotation. For convenience and ease of control the rolls 11, 13 are preferably of the same diameter so that when they are driven at essentially the same speed, they advance the yarn at the same rate and the weight per unit length of the yarn delivered to the resin applicator 16 and subsequently to the mandrel 1 will be the same as that of the yarn drawn off the creel. (The capability of driving the rolls 11, 13 at the same speeds improves versatility since the machine can still be used for continuous filament winding if required.) To adjust, in particular reduce, the weight per unit length of the yarn, the roll 13 of the second nip is rotated faster than the roll 11 of the first nip, with the result that the section of yarn between the two nips is stretched by an amount dependent upon the difference in circumferential speeds of the rolls 11, 13. By adjusting the speed difference the weight per unit length of the yarn, and thereby the yarn diameter, can be varied during the winding process, and by controlling this adjustment in relation to the mandrel rotation, and taking into account the winding pattern being employed, the thickness of the resin impregnated yarn applied to the mandrel can be varied over different regions of the mandrel to obtain the moulded shape required.

As the yarn delivery rate must be synchronised with the rotation of the mandrel, in any practical installation it will probably be most convenient to drive the roll 13 of the second nip at a constant speed and to vary the speed of rotation of the roll 11 in order to adjust the yarn elongation. While it is stated that the roll 13 is rotated at constant speed, this speed may be changed during the winding process to compensate for the build up in thickness of material deposited on the mandrel as the winding progresses, in a manner generally known in the art, or to allow for a non-circular or non-cylindrical mandrel.

It is believed that in a practical embodiment of the invention the circumferential speed of the roll 11 may be varied within the limits of 100% to 10% of the corresponding speed of roll 13, whereby the weight per unit length would be variable within a ratio of around 10:1. Tests have shown that driving the rolls at a speed ratio of 5.2:1 is certainly practical.

Of course, the stretching of the yarn between the nips of the roll pairs 11, 12 and 13, 14 has to take account of the delay in the yarn reaching the mandrel after leaving the second nip, but this does not present any major difficulty and can be catered for in electromechanical control systems or microprocessor control systems as might be employed in putting the invention into practice.

It may be desirable to control the amount of resin applied to the yarn in accordance with its weight per unit length so as to maintain a desired ratio or proportion of resin matrix to reinforcement in the final composite. For this purpose the position of the doctor blade 25 with respect to the roller 20 may be adjusted, preferably automatically in dependence upon the amount by which the yarn 8 is stretched, i.e., the speed differential of the rolls 11, 13.

Figure 2B:
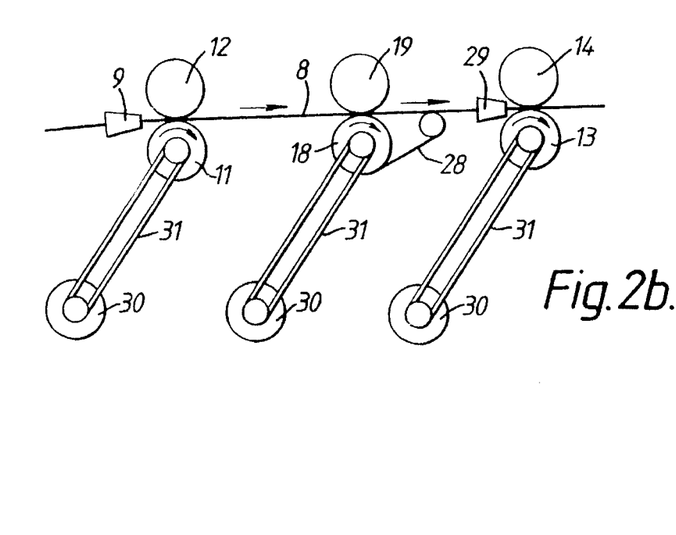

It is not necessary for the yarn to be stretched in a single step and the stretching can instead be carried out in a series of two or more successive stages. Illustrated in FIG. 2b is a modified yarn stretching mechanism which performs a two stage stretching operation. For this purpose an additional pair of rolls 18, 19 is located intermediate the first roll pair 1 1, 12 and the second roll pair 13, 14, the roll 18 like the rolls 11 and 13 being driven by a motor 30 via a toothed belt 31. The yarn is fed to the first roll pair through a yarn guide cone 9 and a further yarn guide 29 is positioned to guide the yarn to the second roll pair 13, 14. Associated with the intermediate roll pair 18, 19 and extending downstream therefrom is a continuous rubber belt 28 which is trained around the driven roll 18 and a parallel roll spaced therefrom. The upper reach of the belt 28 provides some support for the yarn during the second stage stretching. The intermediate driven roll 18 will be driven at a controlled speed intermediate the speeds of the driven rolls 11, 13 so that the yarn 8 is stretched in two sequential stages. It will be appreciated that further pairs of rolls could be included if required so that the stretching is carried out in several stages and hence more gradually. It will be appreciated instead of a separate motor for driving the or each intermediate roll, differential or epicyclic gearing could be used.

The apparatus has been described in relation to the supply of a single yarn to the mandrel, but as is common in the prior art filament winding machines, the apparatus is preferably adapted to feed several yarns to the mandrel at the same time in the general form of a flat tape of spaced parallel yarns.

Figure 3:
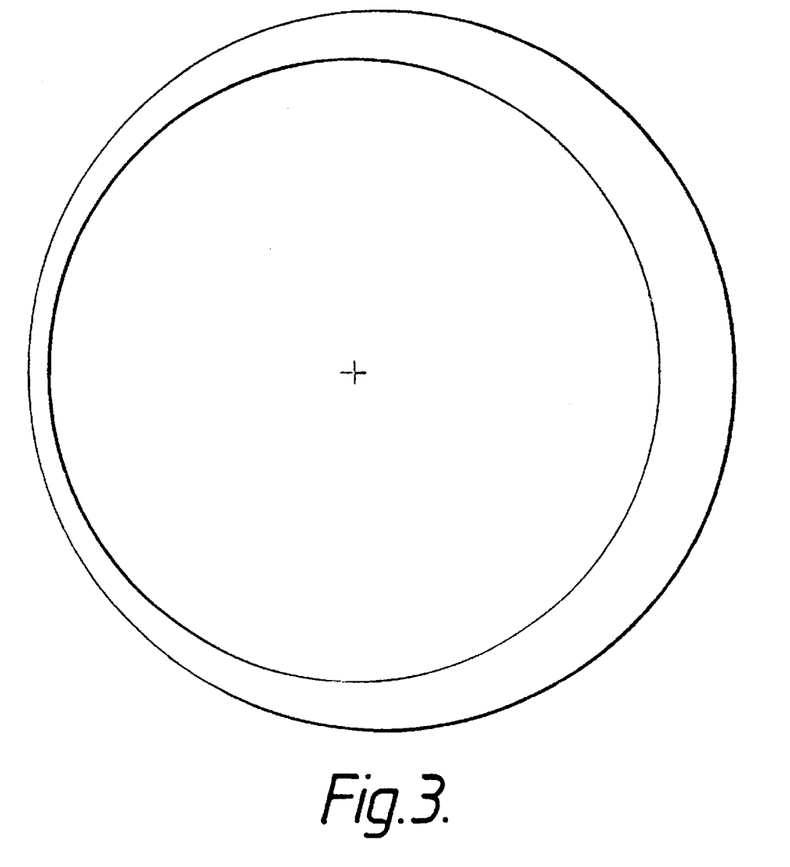
FIG. 3 is a section illustrating a non-symmetrical cylinder which can be produced by the method of the invention.
Figure 4:
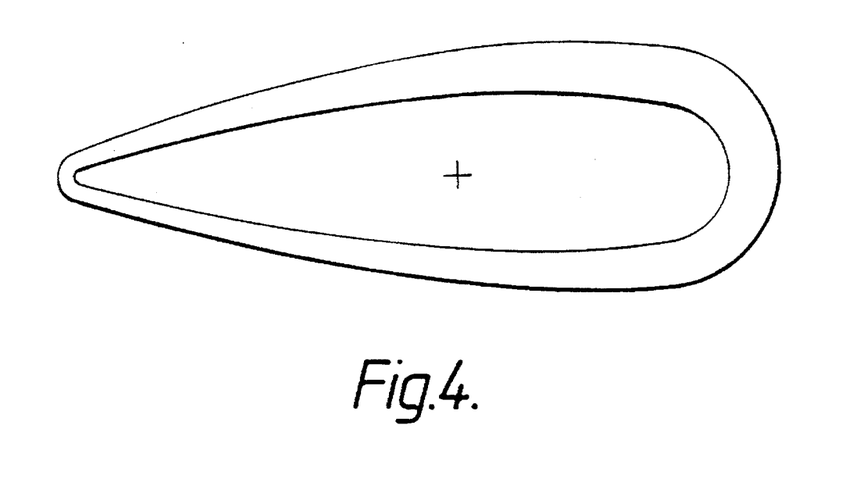
FIG. 4 is a section illustrating an aerofoil produced by the method of the invention.

By enabling the weight per unit length characteristic to be varied during the winding process, the invention gives additional versatility to the filament winding method which has not been previously available. Thus, in the case of winding a parallel cylinder as mentioned herein above, the yarn can be stretched and made thinner during the dwell times at the end of the moulding to eliminate, or at least reduce the size of the bulges at the ends. In addition, it is possible to manufacture articles, e.g., pressure vessels, with uniform wall thickness and substantially uniform fibre distribution, despite the fact that they are non-cylindrical and have relatively complicated shape. In addition, articles can be made with wall thicknesses which vary in a desirable way over the article, such as with normally thinner parts being made thicker than average. Shown by way of example in FIG. 3 is a cylinder which by employing the method of the invention is formed with a wall thickness which varies around the cylinder and has a maximum at a position in diametrical opposition to the position where the thickness is a minimum. FIG. 4 shows another example which is an aerofoil section arranged to have a maximum wall thickness on the upper sides adjacent the leading edge.

It is not essential for all the filaments wound onto the mandrel to have their weight per unit length varied during the winding process, and any filament which is not subject to such elongation can be made of continuous fibre or spun yarn as used in conventional filament winding process. FIGS. 1 and 2a show such an additional yarn 41 being supplied from a bobbin 42 and being introduced into the feed path down stream of the stretching roll pairs, namely at the guide comb 15. Alternatively, yarn 41 could be introduced into the nip between roll pair 13, 14 or through cone 29. The additional yarn 41 is actually combined with the yarn 8, the two yarns being guided through the same eye 17, which has the advantage that the non-extensible yarn 41 can assist in precluding any unwanted additional stretching of the yarn 8 as it is applied onto the mandrel. Any additional continuous fibre or spun yarn 41 of constant weight per unit length may, but need not necessarily be made of the same material as that of the spun yarn 8 which is subject to selective stretching. For example, the additional yarn 41 could be carbon and the yarn 8 glass.

It is normal practice to maintain the yarn being applied to a mandrel under controlled tension (by means not shown) as it influences the resin content of the composite. In the apparatus of the invention as shown a small degree of elongation of the yarn 8 may be permitted between the roll pair 13, 14 and comb 15 to compensate for a mismatch between the speeds of roll 13 and the mandrel 1, assuming no inextensible yarn is introduced before the roll 13.

After being stretched the yarn 8 may be consolidated by means, such as an additional pair of rollers (not shown) with a twisting element to incorporate in the yarn either "false twist" or "self twist", both types of twist being well known in the field of spinning yarn. The final yarn thus obtained may also include the continuous filaments in yarn 41. Another known technique which can be employed to improve the cohesion between the fibres of the staple yarn subsequent to stretching is of "wrap spinning".

The method of the invention can be employed to produce composites wherein the stiffness varies through the thickness of the composite material. One way of achieving this result is to increase the relative amount of additional, e.g. continuous, yarn in the reinforcing filaments applied in those layers where enhanced stiffness is desired, e.g., at the outside surfaces of the composite. In the case of a cylindrical article produced by the filament winding system illustrated in FIGS. 1 and 2, this result can be achieved by winding the reinforcing filaments onto the mandrel with the roll pair 11, 12 being rotated initially at a minimum speed (i.e. the yarn 8 delivered to the mandrel has a minimum weight per unit length), after sufficient thickness has been built up increasing the speed of the roll pair 11, 12 to a maximum (the yarn then being supplied to the mandrel with a maximum weight per unit length), and subsequently reducing the speed of rolls 11, 12 to a minimum again to form the outer layers of the cylindrical article. This particular technique could be used, for example, to produce a pipe for subterranean use having a high resistance to circumferential deformation. Of course it is not essential to employ only maximum and minimum speeds and intermediate speeds are also possible and might be used, for example, to change gradually between high and low speeds.

From the foregoing it will be apparent that in addition to allowing wall thickness to be varied in a way not hitherto possible when using filament winding production methods, the invention also makes it possible to vary strength characteristics within the structure of a composite article.

According to another modification of the method, the resin can be changed during the production process in order to obtain desired characteristics in the finished article. In the embodiment of the method as just described for example, when the speed of the roll pair 11, 12 is increased, the resin supplied to the resin bath 21 could be changed to a different composition, such as from isophthalic polyester resin to orthophthalic polyester resin, and a further change of resin composition may or may not take place when reducing the speed of the roll pair again. Changing the resin may include or consist of adding particulate filler to the liquid resin, or changing the amount of such filler added to the resin. This technique means, for example, that the resin in the core region can be heavily filled with low-cost particulate filler, which can be advantageous for reasons of economy.

Changing the resin type can also influence the strength/stiffness characteristics, but in addition it presents the possibility of changing other properties. For example, an article, such as the subterranean pipe mentioned, may have surface layers which are resistant to chemical attack, both inside and outside, whereas within the interior of the pipe wall structure, i.e., within the core portion of the resin laminate, the properties of the material may be different. For instance the resin in the core may have lower corrosion resistance and be relatively cheap compared with that of the skin layers, and it can include a high level of filler as mentioned above, so that an overall cost saving is made without loss to the corrosion resistance at the surfaces. The incorporation of a high proportion of staple fibres on the neutral axis will give good interlaminar shear strength where the shear stresses are highest.

Figure 5:
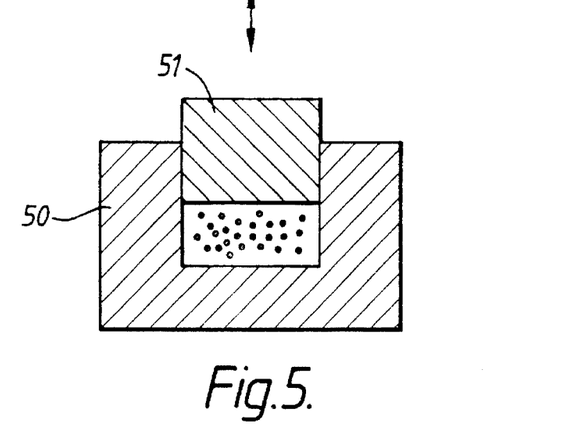
FIG. 5 is a schematic illustration of a pultrusion die.

While the invention has been described so far specifically in relation to a filament winding process in which liquid resin is applied to the yarn, it should be understood that the invention has a wider application. It is also known in filament winding to include fibres of thermoplastic material with the filament wound on the mandrel and either to heat the fibres immediately prior to being wound on the mandrel or to heat the wound mass at the completion of the winding step to melt the thermoplastic material to provide the resin matrix embedding the reinforcing fibres. The invention can be applied to such a process and will secure the same advantages of those already mentioned. In addition, the invention can also be applied with advantage to methods other than filament winding used for producing filament reinforced composites. One such alternative method is that known as "pultrusion" wherein a bundle of filaments, usually continuous fibres, and impregnating resin are pulled through a shaping die to obtain a desired cross section. In accordance with the invention at least some of the filaments may be subject to controlled stretching prior to delivery to the pultrusion die, whereby the section produced may be made to have for example varying flexibility along its length. The die opening can be adjusted in synchronism with the weight per unit length of the filament bundle if this is deemed necessary or desirable. An example of a suitable pultrusion die for producing a composite of rectangular section is shown in FIG. 5. It includes a first, U-shaped die part 50 and a second die part 51 movable relative to the first die part and defining therewith a die orifice of variable cross-section. Of course the movable die member may need to be able to tilt and/or to have a degree of flexibility along its length to facilitate this variation of the die cross-section. The resin impregnated fibre bundle is drawn through the die and the two parts thereof are adjusted according to the amount of fibre passing through the mould and which is varied by stretching yarns fed to the die in accordance with the invention.

Figure 6:
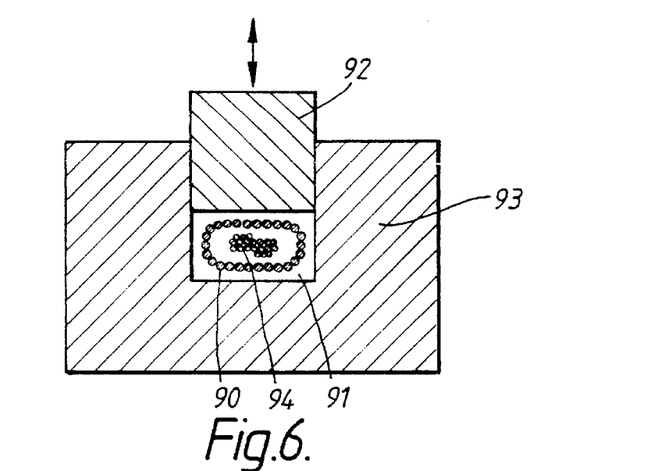
FIG. 6 illustrates a possible distribution of reinforcing filaments in a profile produced by a pultrusion die.

By this embodiment tapering sections can be produced, and it would be possible to produce tension members with thicker extremities for the efficient attachment of end fixings, for instance. The continuous reinforcing filaments will, in the pultrusion technique, be most conveniently concentrated at the surfaces with the staple yarn filaments being concentrated at the core 94 of the composite. The staple fibres will also improve the shear and interlaminar strength where it may be most needed. The concentration of continuous fibres 90, at least some of which may be introduced as a woven fabric or tape, near the surface of a composite 91 formed by pultrusion is depicted in FIG. 6 which shows schematically a cross-section through a variable aperture pultrusion die 92, 93.

Another alternative method involves wrapping a so called prepreg, i.e. a flexible tape with reinforcing filaments incorporated in an uncured or partially cured resin, typically epoxy resin, being wrapped around a former or being laid on a mould to give the desired shape and completing the curing process. As used here the term "tape" is intended to include a group or bundle of parallel fibres. If the reinforcing fibres are subjected to selective and controlled elongation during the preparation of the prepreg tape, their weight per unit length will vary along the tape and the tape may for example decrease in thickness along its length and thereby provide a desired variation of wall thickness in the finished moulded article.

Instead of using a previously prepared prepreg tape, the fibres may be impregnated with resin immediately before laying on the mould. Furthermore, the reinforcement fibres may be mingled with thermoplastic fibres which are then melted under heat and pressure on the mould. In these methods the mould can be flat or any other shape.

As well as the aforementioned processes by which the reinforcing filaments can be incorporated into the resin matrix, another method is feasible and involves the reinforcing filaments which comprise the yarn subject to controlled stretching, being wound in the absence of resin onto a former of required configuration to provide a reinforcement preform which may then be placed in a closed mould for impregnation in resin. The wound preform can be stabilised such as by needling to stitch together the filament windings, by spraying on an emulsion or by applying a powder binder, typically polyester resin (as is well known in the art) and assuming the configuration allows, the preform may be removed in one piece from the former, or the preform could be split, e.g. by slitting into two or more segments to enable removal from the former before being loaded into the mould. To facilitate the preforming operation the former is preferably of a skeletal construction and/or it may comprise surface recesses, e.g. grooves. As an alternative to impregnation of the preform in a mould, it could have thermoplastic fibres incorporated in it and be heated in a press or autoclave to complete the composite manufacture.

Figure 7:
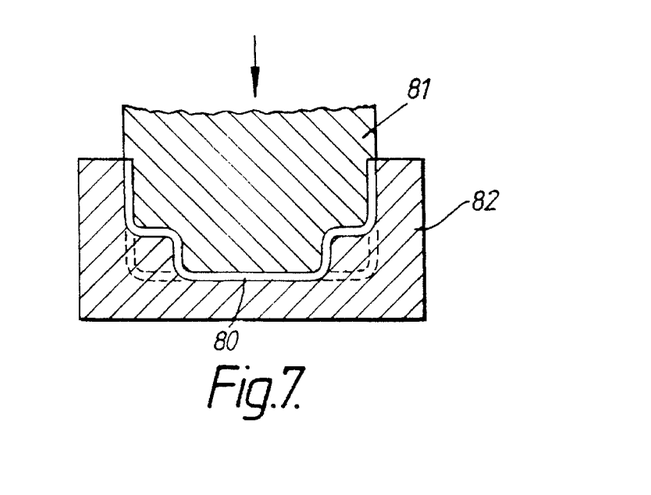
FIG. 7 shows a two-part mould in cross-section.

FIG. 7 illustrates in cross-section a prewound preform 80 (or preform segment) received in a two-part mould 81, 82 ready for moulding with thermosetting resin. The same figure serves also to illustrate a pre-wound preform (or preform segment), incorporating thermoplastic filaments, located in a press ready to be heated. As indicated in broken lines the mould/press can be conformed to alter the shape of the preform upon being closed around the preform such as to produce concave portions by reversal of convex portions.

An additional benefit obtained by the use of discontinuous fibres, as required for the yarn employed in exercising the invention, is that the number of projecting fibre ends is increased and this is known to improve the interlaminar properties of composites compared with the results obtained with continuous fibres. This tendency can be increased by incorporating short fibres, e.g. 10–40 mm long, in the yarn or by texturing the yarn in the area of the comb 15 (FIGS. 1 and 2).

Although the filament winding method of the invention is described herein in relation to an apparatus in which the carriage supporting the yarn feed system is reciprocated to distribute the yarn along the mandrel according to a given winding pattern, the yarn stretching mechanism can be used equally in a filament winding machine of the kind having an eye or the like controlled by a robotic arm and arranged to wind the yarn around a former. It will be appreciated that in such an embodiment the yarn stretching will be synchronised with the eye movements.

The yarn stretching principle may be incorporated into a braiding machine to manufacture a tapering weight preform for a moulded cylinder with varying thickness walls.

The yarn stretching principle may also be used to vary the weight of the warp yarn in a woven fabric for composites reinforcement. Thus a panel such as an aircraft wing skin may be moulded incorporating a woven fabric tapering in weight per unit area in one direction. The fabric could also be wrapped and moulded to produce a cantilever moulding such as a telephone pole where the weight per unit length is required to constantly change for the optimum structural performance.

In addition to those techniques already described hereinabove for incorporating the filamentary reinforcement into the matrix material, any other such techniques as known in the art may be employed. As examples of these known techniques the following may be mentioned:

i) The matrix material is formed in situ within the interstices of a reinforcement preform by a chemical reaction occurring therein, this technique being especially applicable to incorporation of filaments within a ceramic matrix.

ii) The matrix is applied to a preform by vapour deposition, this technique being suitable for composites comprising e.g. carbon filaments within a carbon matrix, the carbon of the matrix material having a different molecular structure to that of the filaments. This process is also appropriate for the manufacture of composites comprising silicon carbide filaments within a matrix consisting of silicon carbide in a different molecular form.

iii) The filament is lead through a slurry of a ceramic powder in a liquid binder, e.g. water which, after the filament has been wound on a mandrel for example, is driven off, such as by heating if the binder is water, following which there is a sintering step involving application of heat and pressure to produce a ceramic matrix. As a modification to this technique a sol or gel can be used instead of the slurry for applying the compound which forms the matrix.

iv) A reinforcing preform is impregnated by infiltration of metal. According to one variant of this technique, the preform is placed in a hollow die, after which molten metal, e.g. a metal alloy, is poured in and a ram is then inserted into the die under pressure to force the metal to impregnate the preform and simultaneously therewith shape the metal according to the article required. In another variant, the reinforcement preform is placed into a mould which is closed and has molten metal injected into it under pressure to impregnate the preform and produce a reinforced component with a shape defined by the mould.

v) For producing composites with carbon filaments within a carbon matrix polymer can be used to form the matrix. The carbon fibres of a preform are initially impregnated/coated with a phenolic resin binder which is reduced to carbon by pyrolysis. The carbon matrix is then built up in a series of successive steps, each of which involves adding an organic alcohol followed by pyrolysis to reduce the alcohol to carbon.

All of the above techniques can be employed with reinforcement filaments which have been subjected to controlled stretching as proposed in accordance with the invention in order to obtain a desired non-uniform strength, stiffness and/or dimension characteristic for the completed composite. The choice of the particular technique to be used in any instance will be determined largely by the materials of the reinforcing filaments and the matrix into which they are to be incorporated. The shape of the composite article being manufactured may also be a relevant factor to be taken into account. Of course the materials selected will be decided by the properties required. For example, carbon-carbon composites are very strong, and composites with silicon carbide reinforcing filaments within a glass matrix exhibit very high temperature resistance.

To avoid any doubt, it should be understood that the invention includes within its scope a method and apparatus in which a sliver is fed from a supply and is subject to controlled stretching by tensioning means before being spun into a staple yarn so that the spun yarn which is delivered directly from the spinning means to a conversion means, has a weight per unit length which varies along the length of the yarn.

I claim:

1. An article consisting of a composite material comprising reinforcing filaments within a matrix, wherein at least one of the filaments is a staple yarn spun from discontinuous fibres and having a weight per unit length which so varies along the length of the filament that the article has a non-uniform physical characteristic the ratio of the maximum weight per unit length to the minimum weight per unit length along the filament being not greater than 10 to 1.

2. An apparatus for use in manufacturing a reinforced composite, comprising means for taking a staple yarn from a supply and guiding the yarn along a feed path to conversion means, wherein yarn tensioning means (11, 12 and 13, 14) are spaced apart along said path and arranged to maintain the yarn under tension therebetween, and control means (30) are provided for controlling said tensioning means during operation of the apparatus to adjust the tension exerted on said yarn running through the tensioning means and thereby to vary in a predetermined controlled manner the weight per unit length of the yarn delivered to the conversion means.

3. An apparatus according-to claim 2, wherein said tensioning means comprise a pair of devices (11, 12; 13, 14) which grip the yarn.

4. An apparatus according to claim 3, wherein one or both devices comprise a roll, the control means being arranged to control the speed of rotation of the roll.

5. An apparatus according to claim 3, wherein each device comprises a nip including a driven roll (11, 13) and an idler roll (12, 14) for gripping the yarn therebetween, the control means being operable to vary the relative rotational speeds of the driven rolls (11, 13).

6. An apparatus according to claim 5, wherein the speed of rotation of the driven roll (11) of the upstream nip is controlled with respect to the speed of rotation-of the driven roll (13) of the downstream nip for adjusting the tension in the yarn.

7. An apparatus according to claim 5, wherein at least one intermediate roll pair (18, 19) is disposed between the upstream nip and the downstream nip for the yarn to be stretched in two or more stages.

8. An apparatus according to claim 2, including means for applying liquid resin to the yarn, and means for adjusting the resin applying means to control the amount of resin applied in accordance with the weight per unit length of the yarn delivered to the conversion means.

9. An apparatus according to claim 8, wherein the resin applying means comprises a roller (20) having a doctor blade (25) cooperating therewith, and the adjusting means is operable to vary the position of the doctor blade relative to the roller (20).

10. A method of manufacturing a reinforced composite comprising the steps of:

(a) providing a staple yarn formed of discontinuous fibres spun with low twist such that the yarn will elongate when subjected to tension forces, (b) applying adjustable tension forces to said staple yarn from step (a) along a length thereof so as to cause said staple yarn to become elongated and to vary a weight per unit length thereof, and (c) combining the elongated staple yarn from step (b) with a matrix-forming material and forming said reinforced composite.

11. A method according to claim 10, including between steps (b) and (c) a step (b') of combining said elongated yarn with a filament of constant weight per unit length.

12. A method according to claim 11, wherein said filament comprises a continuous fibre.

13. A method according to claim 11, wherein said filament comprises an essentially inextensible spun yarn.

14. A method according to claim 10, including between steps (b) and (c) a step (b') of consolidating said elongated yarn to minimize further elongation thereof.

15. A method according to claim 14, wherein said step of consolidating comprises twisting said elongated yarn.

16. A method according to claim 10, wherein step (c) comprises winding said elongated staple yarn on a rotating mandrel, and wherein elongation of said staple yarn in step (b) is controlled by the speed of rotation of said mandrel.

17. A method according to claim 10, wherein in step (b) said staple yarn is passed through a movable guide, and wherein elongation of said staple yarn in step (b) is controlled by movement of said guide.

18. A method according to claim 10, wherein in step (c) a resin is applied to said elongated staple yarn bypassing said elongated staple yarn through a liquid resin-applying means.

19. A method according to claim 18 wherein step (c) comprises adjusting a characteristic of said resin by supplying fillers to resin in said liquid resin-applying means.

20. A method according to claim 10, including between steps b and c and step (b') of forming said staple yarn into a reinforcement preform and wherein step (c) comprises combining said matrix-forming material with said reinforcement preform to form said reinforcement composite.

21. A method according to claim 20, wherein said matrix-forming material is resin and wherein step (c) comprises combining said elongated staple yarn with thermoplastic fibers and heating to melt the thermoplastic fibers and thereby provide said matrix-forming resin.

22. A method according to claim 20, wherein said matrix-forming material is resin and wherein step (c) comprises supplying said elongated staple yarn and resin into a mould.

23. A method according to claim 20, wherein step (c) comprises winding said elongated staple yarn onto a forming means to provide a wound preform, stabilizing the wound preform and separating the wound preform from the forming means.

24. A method according to claim 10, including between steps (b) and (c) a step (b') of combining said elongated staple yarn with a plurality of filaments to provide a bundle of filaments, and wherein in step (c) said bundle of filaments is delivered to a pultrusion die.

25. A method according to claim 24, including a step of adjusting a die opening of said pultrusion die in accordance with a weight per unit length of said bundle of filaments.

26. A method according to claim 24, wherein in step (b') said filaments are combined with said elongated staple yarn so as to surround said elongated staple yarn.

27. A method according to claim 10, wherein step (c) comprises forming a woven fabric.

28. A method according to claim 10, wherein step (b) comprises applying a first tension force to said staple yarn to provide a first elongation thereof and then applying a second tension force thereto to provide a second elongation thereof.

* * * * *